United States Patent Office 3,483,268
Patented Dec. 9, 1969

3,483,268
DIMERISATION PROCESS
James Keith Hambling, Frimley, near Aldershot, and John Robert Jones, Walton-on-Thames, Surrey, England, assignors to The British Petroleum Company Limited, London, England, a corporation of England
No Drawing. Filed June 20, 1966, Ser. No. 558,588
Claims priority, application Great Britain, June 21, 1965, 26,100/65; Apr. 25, 1966, 17,902/66, 17,904/66
Int. Cl. C07c 3/12, 3/10
U.S. Cl. 260—683.15          10 Claims

ABSTRACT OF THE DISCLOSURE

A process for the production of a product consisting predominantly of linear dimers having an internal double bond is provided, which process comprises dimersing an alpha mono olefin containing 3 or more carbon atoms per molecule in the presence of a catalyst comprising nickel acetyl acetonate and an activating agent selected from the group consisting of aluminium alkyl alkoxides and aluminium trialkyls, the molar ratio of nickel acetyl acetonate to activating agent being in the range 2:1 to 0.1:1 at a temperature in the range −40 to 200° C. under such conditions of pressure that the reactants are maintained in the liquid or partially condensed phase.

---

This invention relates to a process for the production of dimers of alpha-olefins, particularly linear dimers.

Processes for the dimerisation of alpha olefins in the presence of aluminium alkyls, either as the sole catalytic entity or in combination with a minor proportion of an activator, are known.

British patent specification No. 713,081—Ziegler discloses a process for the polymerisation of ethylene which comprises contacting ethylene at a temperature within the range 60°–250° C. with an activator selected from hydrides of aluminium, gallium, indium and beryllium and derivatives of such hydrides in which one or more of the hydrogen atoms are substituted by hydrocarbon radicals selected from the group consisting of alkyl radicals and monovalent aromatic hydrocarbon radicals.

In particular, British patent specification No. 713,081 discloses the polymerisation of ethylene to butene-1 and higher linear alpha-olefins by contacting ethylene with aluminium triethyl at 200°–220° C. under super-atmospheric pressure.

British patent specification No. 742,642—Ziegler discloses a process for the dimerisation of a mono-olefin containing more than two carbon atoms in the molecule which comprises heating the mono-olefin at a temperature within the range 60°–250° C. in the presence of an activator selected from the hydrides of beryllium, aluminium, gallium and indium and derivatives of such hydrides in which one or more of the hydrogen atoms are substituted by hydrocarbon radicals selected from the group consisting of alyky radicals and mono-valent aromatic hydrocarbon radicals.

In particular British patent specification No. 742,642 discloses the dimerisation of propylene to a product consisting predominantly of 2-methylpentene-1 by contacting propylene with aluminium triethyl at temperatures in the range 180°–240° C. under super-atmospheric pressure.

British patent specification No. 773,536—Ziegler discloses a process for the catalytic polymerisation of ethylene to form butene, hexene or higher liquid or solid paraffin-like polymers or mixtures thereof in the presence of an aluminium trialkyl of general formula

wherein $R_1$, $R_2$ and $R_3$ represent similar or dissimilar alkyls, in which the aluminum trialkyl is activated by nickel, cobalt or platinum.

In particular British patent specification 773,536 discloses the polymerisation of ethylene to butene-1 and higher linear alpha-olefins by contacting ethylene with aluminium triethyl and a minor proportion of nickel acetyl acetonate at 100° C. The advantage of the process described in British patent specification 773,536 with respect to prior art processes, e.g. 713,081, is stated to lie in the fact that it can be effected at much lower temperatures.

One would therefore expect that the dimerisation of an alpha-olefin, for example propylene in the presence of a catalyst comprising an activating agent, for example an aluminium trialkyl and a complex nickel compound, for example nickel acetyl acetonate, would result in the production of a product consisting predominantly of a branched chain olefin, for example 2-methylpentene-1, and that this process could be effected at lower temperatures than those disclosed in British patent specification 742,642.

We have surprisingly discovered that dimersing an alpha-olefin in the presence of a catalyst comprising a relatively large proportion of a complex organic compound of a metal of Groups I–B or VIII of the Periodic Table according to Mendeleef and a reducing agent results in the production of a product which consists predominantly of linear dimers having an internal double bond.

According to the present invention there is provided a process for the production of a product consisting predominantly of linear dimers having an internal double bond which process comprises dimerising and alpha-olefin in the presence of a catalyst comprising a complex organic compound of a metal of Group VIII of the Periodic Table according to Mendeleef and an activating agent at a temperature in the range −40° to +200° C., under such conditions of pressure that the reactants are maintained in the liquid or partially condensed phase.

Suitable activating agents are Grignard reagents, metal alkyls and other organo metallic compounds.

The preferred complex organic compound is nickel acetyl acetonate.

Preferably the moisture content of the nickel acetyl acetonate is reduced to below 3% by weight before use. In general, the lower the moisture content the better.

The preferred activating agents are organo aluminum compounds, most preferably aluminium alkyl alkoxides. The preferred aluminium alkyl alkoxide is aluminium di-diethyl ethoxide. Aluminum trialkyls, e.g., aluminium triethyl are also suitable.

Aluminium dialkyl alkoxides are preferred because they react gently with the complex organic compound and catalysts of consistent quality are obtained in successive preparations. Some other activating agents, e.g., aluminium trialkyls, react more vigorously and render temperature control of the catalyst preparation reaction more difficult. As a result, it is more difficult to obtain catalysts of consistent quality. Nevertheless, useful catalysts are obtained from such agents.

Preferably dimerisation is effected under a pressure in the range 200 to 2000 p.s.i.g.

The molar ratio of the Group VIII compound to the activating agent is suitably in the range 2:1 to 0.1:1, preferably in the range 1.0:0.8 to 1:2.

Preferably the catalyst is prepared by adding the complex organic compound of the Group VIII metal and the activating agent to an inert diluent. Suitable diluents include normally liquid hydrocarbons and halogenated hydrocarbons. The preferred diluents are aromatic and halogenated aromatic liquids, e.g., benzene, toluene, xylene and chlorobenzene. The latter act as solvents for both components of the catalyst and thus produce a homogenous catalyst system which is of increased reproducible activity when compared with heterogeneous systems.

Dimerisation is then effected in the presence of the catalyst dispersion or solution.

The catalyst must be preserved from contact with water, oxygen, alcohols, ethers, amines, phosphines, sulphur compounds, dienes, acetylenes, carbon monoxide and other complexing ligands which displace olefins from transition metal complexes. The presence of substantial quantities of these materials will destroy or reduce the efficiency of the catalyst.

The invention is illustrated by the following examples.

EXAMPLE 1

2.5 g. anhydrous nickel acetyl acetonate were slurried in 50 ml. cyclohexane at 0° C. 2.0 ml. aluminium triethyl were added drop-wise to the mixture which was stirred magnetically over a 30 minute period. Admixture was carried out in an atmosphere of dry, oxygen-free, nitrogen.

The total mixture was transferred to a 1 litre stainless steel rocking autoclave which was then pressured with propylene at 750 p.s.i.g. and 40° C. After a reaction period of 16½ hours, the total reaction products were collected in traps cooled by solid carbon dioxide and acetone.

114 g. of a residual liquid were obtained. This was found to contain 26 g. solvent cyclohexane, 71 g. hexenes and 17 g. higher polymers. The hexene fraction contained 74% linear hexenes as indicated in the following table:

Detailed hexene analysis

|   | Percent |
|---|---|
| Hexene-1 | 5.0 |
| Hexene-2 | 56.0 |
| Hexene-3 | 13.0 |
| Total | 74.0 |
| 4-methylpentene-1 | 2.0 |
| 4-methylpentene-2 | 4.0 |
| 2-methylpentene-2 | 12.0 |
| 2-methylpentene-1 | 6.5 |
| 2,3-dimethylbutene-1 | 1.0 |
| 2,3-dimethylbutene-2 | 0.5 |

EXAMPLE 2

2.5 g. anhydrous nickel acetyl acetonate were slurried in 21 g. n-heptane at 0° to 5° C. 2.0 ml. aluminum diethyl ethoxide were added dropwise to the mixture which was stirred magnetically over a 30 minute period. Admixture was carried out in an atmosphere of dry, oxygen free, nitrogen. The total mixture was transferred to a 1 litre stainless steel rocking autoclave which was then pressured with propylene at 600 p.s.i.g. and 40° C. After a reaction period of 16½ hours, the total reaction products were collected in traps cooled by solid carbon dioxide and acetone. 70 g. total polymer were obtained. This was found to contain 83% hexenes. The hexene fraction contained 78% linear hexenes and 8.3% 2-methylpentene-2.

EXAMPLES 3–5

The procedure of Example 2 was repeated. Reaction conditions and product analyses are set out in the following Table 1.

TABLE 1
[Polymerisation effected at 40° C. and 600 p.s.i.]

| Example | Ni(AcAc)$_2$ (g.) | AlEt$_2$OEt cc. (as 10%—soln) | Mole ratio Ni:Al | Solvent Diluent | Addition of Catalyst Reactants Time (mins.) | Temp., ° C |
|---|---|---|---|---|---|---|
| 2 | 2.5 | 2.0 | 1.0:1.35 | 21 g. heptane | 30 | 0–5 |
| 3 | 2.5 | 2.0 | 1.0:1.35 | 26 g. toluene | 15 | 0–5 |
| 4 | 2.5 | 1.5 | 1.0:1.0 | 50 g. n-heptane | 15 | 0–5 |
| 5 | 2.5 | 2.0 | 1.0:1.35 | 15 g. l./l. benzene/n-heptane | 30 | 0–5 |

| Example | Percent water in Ni(AcAc)$_2$ | Reaction time (hours) | Total polymer (g.) | Percent C$_6$ in polymer | Hexenes Percent nC$_6$ | Percent 2MP2 | Activity g./g./Ni (AcAc)$_2$/h |
|---|---|---|---|---|---|---|---|
| 2 | 2.7 | 17.8 | 70 | 85 | 78.0 | 8.3 | 1.6(1) |
| 3 | 2.7 | 16.8 | 62 | 85 | 78.0 | 8.5 | 1.5(5) |
| 4 | 0.5 | 19.0 | 150 | 81 | 75.0 | 8.7 | 2.9(8) |
| 5 | 2.7 | 16.5 | 115 | 87 | 79.0 | 7.4 | 2.8(9) |

EXAMPLES 6 AND 7

Example 2 was repeated with the exception that the heptane diluent was replaced by a toluene solvent. Reaction conditions and product analyses are set out in the following Table 2.

TABLE 2
[Polymerisation effected at 40°C. and 600 p.s.i.]

| Example | NiAcAc(g.) | AlEt$_2$OEt cc. (as 10% soln.) | Mole ratio Ni:Al | Solvent diluent | Addition of Catalyst Reactants Time (mins.) | Temp. ° C. |
|---|---|---|---|---|---|---|
| 6 | 2.5 | 1.5 | 1.0:1.0 | 26 g. toluene | 15 | 0–5 |
| 7 | 2.5 | 1.5 | 1.0:1.0 | 50 g. toluene | 15 | 0–5 |

| Example | Percent water in Ni(AcAc)$_2$ | Reaction time (hours) | Total polymer (g.) | Percent C$_6$ in polymer | Hexenes Percent nC$_6$ | Percent 2MP2 | Activity g./g.Ni (AcAc)$_2$/h |
|---|---|---|---|---|---|---|---|
| 6 | 2.7 | 17.5 | 109 | 84 | 78.5 | 7.4 | 2.3(6) |
| 7 | 0.5 | 16.8 | 113 | 88 | 77.5 | 7.5 | 2.7(7) |

What we claim is:

1. A process for the production of a product consisting predominantly of linear dimers having an internal double bond which process comprises dimerising an alpha mono olefin containing 3 to 6 carbon atoms per molecule in the presence of a catalyst comprising nickel acetyl acetonate and an activating agent selected from the group consisting of aluminum alkyl alkoxides and aluminum trialkyls, the molar ratio of nickel acetyl acetonate to activating agent being in the range 2:1 to 0.1:1 at a temperature in the range −40 to 200° C., under such conditions of pressure that the reactants are maintained in the liquid or partially condensed phase.

2. A process according to claim 1 wherein the activating agent is an aluminium alkyl alkoxide.

3. A process according to claim 2 wherein the activating agent is aluminium diethyl ethoxide.

4. A process according to claim 1 wherein the activating agent is an aluminium trialkyl.

5. A process according to claim 4 wherein the aluminium trialkyl is aluminium triethyl.

6. A process according to claim 1 wherein the molar ratio of the nickel acetyl acetonate to the activating agent is in the range 1.0:0.8 to 1:2.

7. A process according to claim 1 wherein catalyst preparation is effected in the presence of an inert diluent.

8. A process according to claim 7 wherein the diluent is an aromatic or halogenated aromatic compound.

9. A process according to claim 8 wherein the diluent is benzene, toluene or xylene.

10. A process according to claim 1 wherein the olefin is propylene.

References Cited

UNITED STATES PATENTS

| | | |
|---|---|---|
| 2,781,410 | 2/1957 | Ziegler et al. |
| 3,219,716 | 11/1965 | Wittenberg et al. _____ 260—66 |
| 3,321,546 | 5/1967 | Roest et al. |
| 3,364,278 | 1/1968 | Reusser. |

PAUL M. COUGHLAN, JR., Primary Examiner

PO-1050
(5/69)

UNITED STATES PATENT OFFICE
CERTIFICATE OF CORRECTION

Patent No. 3,483,268           Dated December 9, 1969

Inventor(s) James Keith Hambling and John Robert Jones

It is certified that error appears in the above-identified patent and that said Letters Patent are hereby corrected as shown below:

Column 1, line 57 "alyky" should read --alkyl--;

Column 4, Table I, under the heading "Solvent Diluent"

"21 g. heptane" should read --21 g. n-heptane--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents